(12) United States Patent
Volkel et al.

(10) Patent No.: US 8,404,093 B2
(45) Date of Patent: Mar. 26, 2013

(54) FLOW DE-IONIZATION USING INDEPENDENTLY CONTROLLED VOLTAGES

(75) Inventors: Armin R. Volkel, Mountain View, CA (US); Meng H. Lean, Santa Clara, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 956 days.

(21) Appl. No.: 12/328,682

(22) Filed: Dec. 4, 2008

(65) Prior Publication Data

US 2010/0140092 A1 Jun. 10, 2010

(51) Int. Cl.
*B01D 57/02* (2006.01)
*B01D 61/46* (2006.01)

(52) U.S. Cl. ........ 204/627; 204/518; 204/522; 204/542; 204/633

(58) Field of Classification Search ............... 204/522, 204/529, 547, 550, 553, 627, 633, 636, 637, 204/638, 639, 253, 267, 631
See application file for complete search history.

(56) References Cited

U.S. PATENT DOCUMENTS

| | | | | |
|---|---|---|---|---|
| 3,242,059 A | * | 3/1966 | Cottam et al. | 205/512 |
| 3,766,039 A | * | 10/1973 | Gilchrist | 204/541 |
| 3,980,534 A | * | 9/1976 | Drakesmith | 205/430 |
| 4,225,413 A | | 9/1980 | Karn | |
| 6,200,456 B1 | * | 3/2001 | Harrar et al. | 205/553 |
| 6,471,844 B1 | * | 10/2002 | Samuels et al. | 204/529 |
| 6,627,061 B2 | * | 9/2003 | Mani | 204/531 |
| 2003/0105533 A1 | * | 6/2003 | Hirokawa et al. | 700/1 |
| 2004/0060823 A1 | * | 4/2004 | Carson et al. | 204/627 |
| 2007/0170060 A1 | | 7/2007 | Bourcier et al. | |

OTHER PUBLICATIONS

Lenntech. "Membrane technology." Dec. 3, 2007 capture of <http://www.lenntech.com/electrodialysis.htm> using Wayback Machine Internet Archive <http://web.archive.org>.*
The American Heritage Dictionary. AHD Entry: 'memrane.' Houghton Mifflin Harcourt Publishing Company. Accessed Jun. 7, 2012. <http://ahdictionary.com/word/search.html?q=membrane>.*

* cited by examiner

*Primary Examiner* — Keith Hendricks
*Assistant Examiner* — Steven A. Friday
(74) *Attorney, Agent, or Firm* — Blakely Sokoloff Taylor & Zafman LLP

(57) ABSTRACT

An embodiment is a method and apparatus to provide de-ionization. First and second conductive porous membranes are placed between a feed channel having a feed flow and first and second concentration channels having first and second concentration flows to separate the feed channel from the concentration channels. Cathode and anode electrodes are placed on external sides of the concentration channels. A voltage supply distribution network provides independent voltages across the channels to cause movement of ions in the feed and concentration flows toward the electrodes.

23 Claims, 10 Drawing Sheets

FLOW DE-IONIZATION USING INDEPENDENTLY CONTROLLED VOLTAGES

TECHNICAL FIELD

The presently disclosed embodiments are directed to the field of flow systems, and more specifically, to flow de-ionization.

BACKGROUND

The need to remove all or selected species of ions from liquids is a common problem in many industries. One fast growing market is the desalination of brackish and sea water for municipal water supplies. Typical ways to separate the dissolved salts from water include phase change technologies, such as flash distillation, or membrane-based technologies such as reverse osmosis, both of which are energy intensive. For brackish water, two alternative techniques that use transverse electric fields are available: electrodialysis (ED) and capacitive de-ionization (CD). However, both of these techniques have a number of drawbacks.

In ED, a feed stream flows between two parallel membranes. An applied voltage perpendicular to the flow causes the dissolved ions to move, with the negatively charged ions (e.g., chloride) traveling towards the anode and the positively charged species (e.g., sodium) towards the cathode. The membranes are designed to let the corresponding ions leave the feed stream, but not to reverse direction. This causes the feed stream to de-ionize, while the waste streams in the adjacent compartments increase in salinity. A pair of feed and waste stream plus the membranes between them forms a cell. The main problem with ED techniques is that the voltage drop across the feed and waste channels varies with changes in ion concentration in the different channels and along the channels. This leads to energy inefficiencies as the optimal electric field condition can only be maintained across a small section of the entire system.

In CD, a process stream flows between two parallel electrodes designed to have a very large surface area. An applied voltage perpendicular to the flow causes the dissolved ions to move. The porous electrodes capture the ions in a Debye layer which can hold a large number of ions due to the large surface area. Once the electrode surface is saturated, a regeneration step starts where the voltage is turned off, or a small reverse voltage is applied to repel the ions back into the channel. This water, which can have a much higher ion concentration than the feed water is discarded and the whole process is repeated. The problem with CD is that it is a non-continuous process and relies on the long-term reversibility of the ion trapping and release mechanism.

SUMMARY

One disclosed feature of the embodiments is a method and apparatus to provide de-ionization. First and second conductive porous membranes are placed between a feed channel having a feed flow and first and second concentration channels having first and second concentration flows to separate the feed channel from the concentration channels. Cathode and anode electrodes are placed on external sides of the concentration channels. A voltage supply distribution network provides independently controlled voltages across the channels to cause movement of ions in the feed and concentration flows toward the electrodes.

One disclosed feature of the embodiments is a method and apparatus to provide de-ionization. A feed channel has a feed flow with a first flow direction. A plurality of cylindrical-shaped conductive membranes are placed in the feed channel. Each of the conductive membranes encloses a concentration channel having a second flow direction and an electrode positioned inside the conductive membrane. A voltage distribution network is coupled to the conductive membranes to provide independently controlled voltages across the channels to cause movement of ions in the feed and concentration flows toward the electrode.

One disclosed feature of the embodiments is a method and apparatus to provide particulate extraction and de-ionization. A pre-treatment subsystem extracts particles from an input water source. A de-ionization subsystem deionizes fluid from the pre-treatment subsystem. The de-ionization system includes a first de-ionization unit. The first de-ionization unit includes first and second conductive porous membranes placed between a feed channel having a feed flow and first and second concentration channels having first and second concentration flows to separate the feed channel from the concentration channels, cathode and anode electrodes placed on external sides of the concentration channels, and a voltage supply distribution network to provide independent voltages across the channels to cause movement of ions in the feed and concentration flows toward the electrodes.

BRIEF DESCRIPTION OF THE DRAWINGS

Embodiments may best be understood by referring to the following description and accompanying drawings that are used to illustrate embodiments. In the drawings.

DETAILED DESCRIPTION

Figure 1:
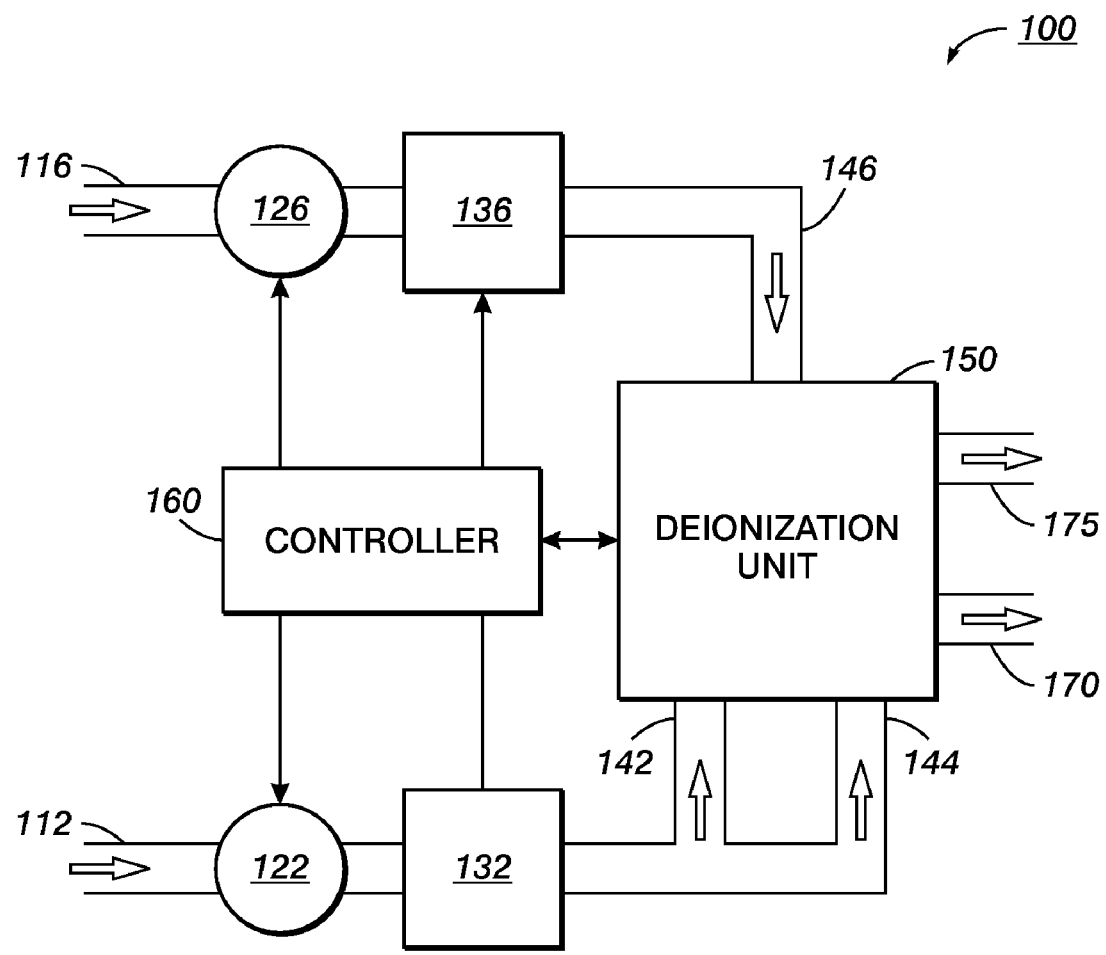
FIG. 1 is a diagram illustrating a system according to one embodiment.

One disclosed feature of the embodiments is a technique to provide continuous de-ionization. First and second conductive porous membranes are placed between a feed channel having a feed flow and first and second concentration channels having first and second concentration flows to separate the feed channel from the concentration channels. Cathode and anode electrodes are placed on external sides of the concentration channels. A voltage supply distribution network provides independent voltages across the channels, e.g., between the anode, the two conductive porous membranes and the cathode, to cause movement of ions in the feed and concentration flows toward the electrodes. The advantages of this approach include the ability to optimize the voltage drop across each channel independently based on their electrical parameters such as ion conductivity, etc.

In another embodiment, the electrodes and membranes are split into independent units along the flow channels. This segmentation allows independently controllable voltage drops across each channel and the ability to optimize voltage drops along each segment in each channel. This is particularly beneficial in de-ionization applications where the ion concentration in each of the channels changes along the channel length.

One disclosed feature of the embodiments is a method and apparatus to provide de-ionization. A feed channel has a feed flow with a first flow direction. A plurality of cylindrical-shaped conductive membranes are placed in the feed channel. Each of the conductive membranes encloses a concentration channel having a second flow direction and an electrode positioned inside the conductive membrane. A voltage distribution network is coupled, or connected, to the conductive membranes to provide independently controlled voltages across the channels to cause movement of ions in the feed and concentration flows toward the electrode.

One disclosed feature of the embodiments is a method and apparatus to provide particulate extraction and de-ionization. A pre-treatment subsystem extracts particles from an input water source. A de-ionization subsystem de-ionizes fluid from the pre-treatment subsystem. The de-ionization system includes a first de-ionization unit. The first de-ionization unit includes first and second conductive porous membranes placed between a feed channel having a feed flow and first and second concentration channels having first and second concentration flows to separate the feed channel from the concentration channels, cathode and anode electrodes placed on external sides of the concentration channels, and a voltage supply distribution network to provide independent voltages across the channels to cause movement of ions in the feed and concentration flows toward the electrodes.

In the following description, numerous specific details are set forth. However, it is understood that embodiments may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

FIG. 1 is a diagram illustrating a system 100 according to one embodiment. The system 100 represents a de-ionization system that may be used in a number of applications. In one embodiment, the system 100 is used in water treatment or desalination applications. The system 100 includes input concentration channel 112, an input feed channel 116, pumps 122 and 126, valves 132 and 136, a de-ionization unit 150, and a controller 160. The system 100 may include more or less than the above components.

The input concentration channel 112 carries an input concentration fluid flow. The concentration fluid flow may be water or any appropriate fluid. The input feed channel 116 carries input fluid flow which contains ions to be removed by the de-ionization unit 150. In one embodiment, the feed fluid flow may include brackish, brine, and/or sea water.

The pumps 122 and 126 pump the respective fluids in the channels 112 and 116 to deliver the fluids to the de-ionization unit 150. The valves 132 and 136 control the fluid flow rates in the respective channels 112 and 116. After the pump 122 and the valve 132, the input concentration channel 112 splits into the concentration channels 142 and 144 that carry the concentration fluid directly to the de-ionization unit 150. Similarly, after the pump 126 and the valve 136, the feed channel becomes the feed channel 146 that carries the feed fluid directly to the de-ionization unit 150.

The de-ionization unit 150 de-ionizes the feed fluid carried by the feed channel 146. It may cause movements of ions in the feed fluid to the concentration fluids. As the flows in the channels proceed through the de-ionization unit 150, the ion concentration in the feed channel 146 decreases while the ion concentration in the concentration channels 142 and 144 increase. The de-ionization unit 150 may be a cell or a number of cells stacked together. It typically uses independent or independently controlled voltages across the feed and the concentration channels. By having independent control of the voltages, the removal of the ion may be enhanced, intensified, or increased while the power loss due to hydrolysis may be reduced or eliminated. The highly concentrated fluids from the concentration channels become waste streams and may be taken out from an outlet 170. Similarly, the de-ionized fluid in the feed fluid may also be taken out of an outlet 175.

The controller 160 controls the pumps 122 and 126 and the valves 132 and 136. It may also control the de-ionization unit 150. It may include a computer or a process controller to perform the control functions.

Figure 2:
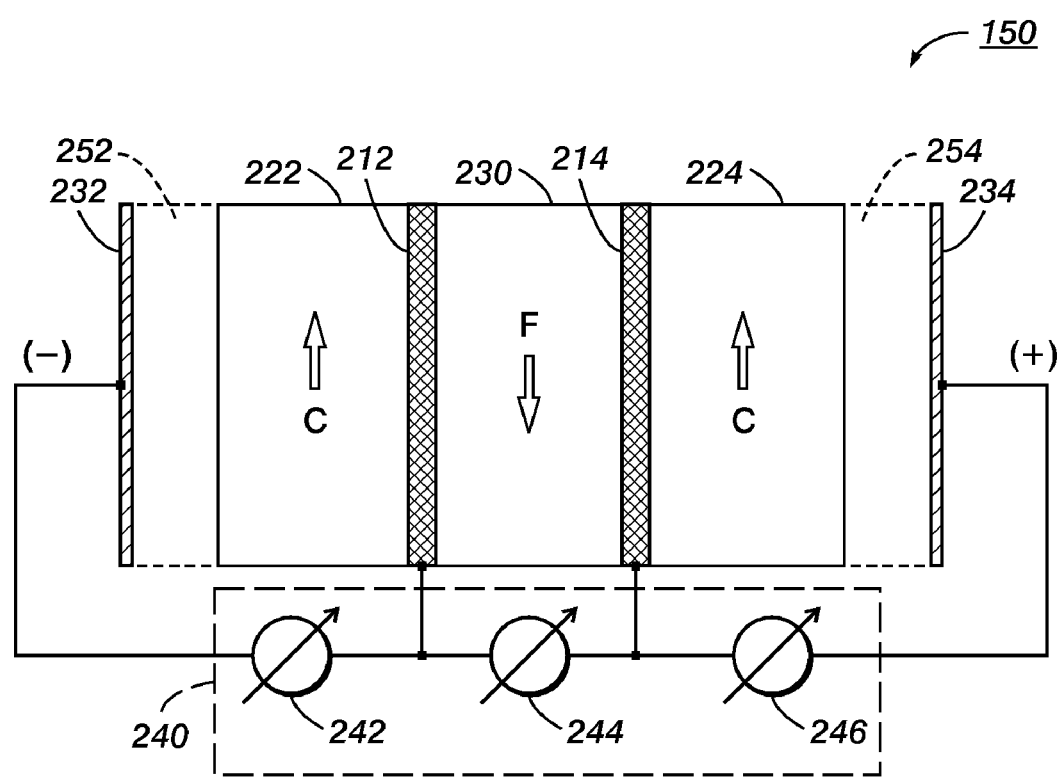
FIG. 2 is a diagram illustrating a de-ionization unit according to one embodiment.

FIG. 2 is a diagram illustrating the de-ionization unit 150 shown in FIG. 1 according to one embodiment. The de-ionization unit 150 may include membranes or media 212 and 214, first and second concentration channels 222 and 224, a feed channel 230, buffer chambers 252 and 254, and electrodes 232 and 234, and voltage distribution network 240. The de-ionization unit 150 may include more or less than the above components.

The first and second membranes 212 and 214 may be conductive porous membranes placed between the feed channel 230 having a feed flow and the first and second concentration channels 222 and 224 having first and second concentration flows, respectively, to separate the feed channel 230 from the concentration channels 222 and 224. The membranes 212 and 214 may be made of electrically conductive porous materials such as carbon aerogels or porous aluminum foams or any suitable conductive porous materials. The first and second concentration channels 222 and 224 correspond to the channels 142 and 144, respectively, shown in FIG. 1. The feed channel 230 corresponds to the feed channel 146 shown in FIG. 1. In one embodiment, the flow direction of the feed flow is opposite of the flow directions of the concentration flows.

The electrodes 232 and 234 include a cathode electrode 232 and anode electrode 234. They are placed on external sides of the concentration channels 222 and 224.

The buffer chambers 252 and 254 may be optional. They may be placed between the respective electrodes 232 and 234 and the concentration channels 222 and 224.

The voltage supply distribution network 240 is coupled to the electrodes 232 and 234 to provide independent voltages across the channels 222, 230, and 224 to cause movement of ions in the feed and concentration flows toward the electrodes 232 and 234. The network 240 may include first, second, and third voltage sources 242, 244, and 246. The first, second, and third voltage sources 242, 244, and 246 may be any suitable constant or variable voltage sources that may provide independent voltages to the electrodes 232, 234 and the membranes 212 and 214. They may be independently controlled by the controller 160 (FIG. 1), or they may be fixed or manually controlled. The first voltage source 242 may be placed, positioned, or attached between the cathode electrode 232 and the first conductive porous membrane 212. The second voltage source 244 may be placed, positioned, or attached between the first conductive porous membrane 212 and the second conductive porous membrane 214. The third voltage source 246 may be placed, positioned, or attached between the second conductive porous membrane 224 and the anode electrode 234.

The de-ionization unit or cell 150 shown in FIG. 2 may be assembled either as a traditional membrane stack with straight parallel fluid channels or as a spiral wound system if the membranes are flexible enough.

Figure 3:
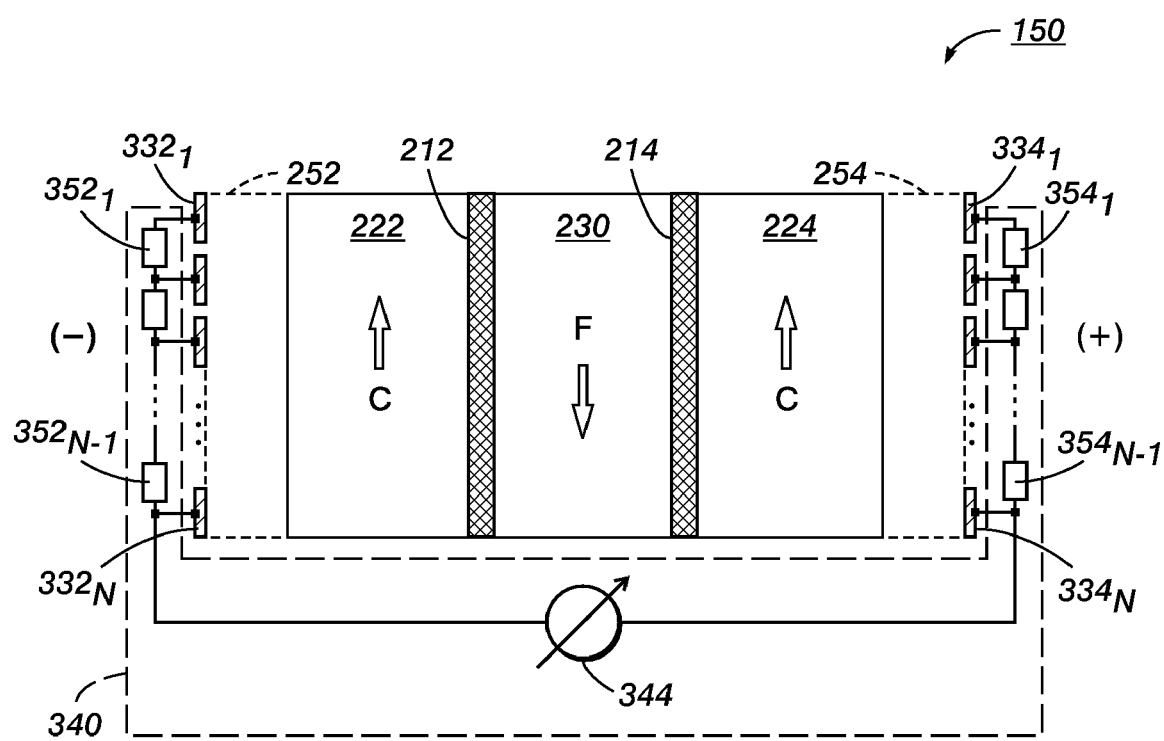
FIG. 3 is a diagram illustrating a de-ionization unit with segmented electrodes according to one embodiment.

FIG. 3 is a diagram illustrating the de-ionization unit 150 shown in FIG. 1 with segmented electrodes according to one embodiment. The embodiment in FIG. 3 is similar to the embodiment shown in FIG. 2 with the exception of the electrodes and the voltage distribution network. This embodiment includes the same components 212, 214, 222, 224, 230, and 252 and 254 as shown in FIG. 2. In addition, it includes N electrodes $332_1$ to $332_N$, N electrodes $334_1$ to $334_N$, and a voltage distribution network 340.

The N electrodes $332_1$ to $332_N$ are segment cathode electrodes placed along flow direction of the first concentration channel 222. The N electrodes $334_1$ to $334_N$ are segment anode electrodes placed along flow direction of the second concentration channel 224.

The voltage distribution network 340 includes N−1 electrical elements $352_1$ to $352_{N-1}$, N−1 electrical elements $354_1$ to $354_{N-1}$, and a supply voltage source 344. The N−1 electrical elements $352_1$ to $352_{N-1}$ are first electrical elements coupled to the segment cathode electrodes $332_1$ to $332_N$ to provide potential differences between the segment cathode electrodes. They may be resistors or elements that provide appropriate voltage drops such that the potential differences at the segment cathode electrodes $332_1$ to $332_N$ are different. Each of the N−1 electrical elements $352_1$ to $352_{N-1}$ is inserted between two adjacent segment cathode electrodes. Similarly, the N−1 electrical elements $354_1$ to $354_{N-1}$ are second electrical elements coupled to the segment anode electrodes $334_1$ to $334_N$ to provide potential differences between the segment anode electrodes. They may be resistors or elements that provide appropriate voltage drops such that the potential differences at the segment anode electrodes $334_1$ to $334_N$ are different. Each of the N−1 electrical elements $354_1$ to $354_{N-1}$ is inserted between two adjacent segment cathode electrodes. By selecting proper values for the electrical elements $352_1$ to $352_{N-1}$ and $354_1$ to $354_{N-1}$, the voltages across the channels may be independently controlled, leading to more efficient ion removal.

The supply voltage source 344 may be connected to the segment cathode and anode electrodes via the first and second electrical elements $352_1$ to $352_{N-1}$ and $354_1$ to $354_{N-1}$ to provide incremental voltage differences across the channels 222, 230, and 224 along the flow directions of the first and second concentration channels 222 and 224.

Figure 4:
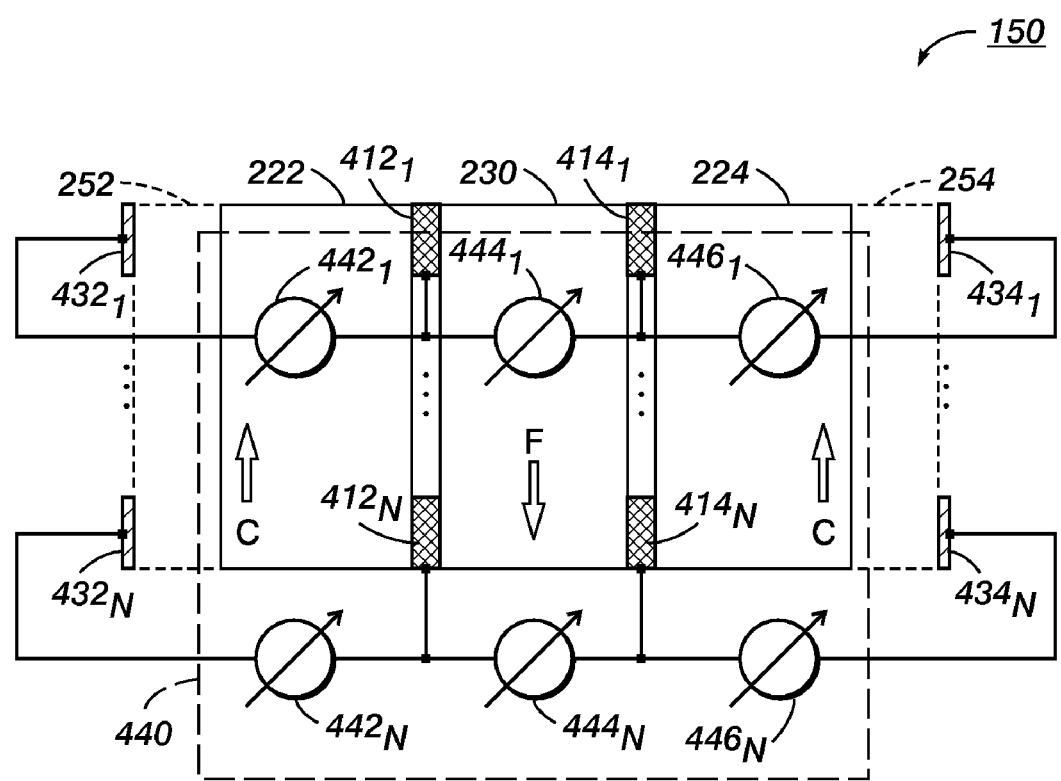
FIG. 4 is a diagram illustrating a de-ionization unit with segmented electrodes and segmented conductive membranes according to one embodiment.

FIG. 4 is a diagram illustrating the de-ionization unit 150 shown in FIG. 1 with segmented electrodes and segmented conductive membranes according to one embodiment. The embodiment in FIG. 4 is similar to the embodiment shown in FIG. 2 except that the conductive membranes and the electrodes are segmented and there are additional voltage sources to provide independent voltages for the segmented electrodes. This embodiment includes the same components 222, 224, 230, and 252 and 254 as shown in FIG. 2. In addition, it includes N first conductive membranes $412_1$ to $412_N$, and N second conductive membranes $414_1$ to $414_N$, N electrodes $432_1$ to $432_N$, N electrodes $434_1$ to $434_N$, and a voltage distribution network 440.

The N first conductive membranes $412_1$ to $412_N$ are membrane segments of the first conductive porous membrane. The N second conductive membranes $414_1$ to $414_N$ are membrane segments of the second conductive porous membrane. The N first conductive membranes $412_1$ to $412_N$ and the N second conductive membranes $414_1$ to $414_N$ may be made by material similar to that of membranes 212 and 214 shown in FIG. 2.

The N electrodes $432_1$ to $432_N$ are segment cathode electrodes placed along flow direction of the first concentration channel 222. The N electrodes $434_1$ to $434_N$ are segment anode electrodes placed along flow direction of the second concentration channel 224.

The voltage distribution network 440 includes N voltage sources $442_1$ to $442_N$, N voltage sources $444_1$ to $444_N$, and N voltage sources $446_1$ to $446_N$. The N voltage sources $442_1$ to $442_N$ are first voltage sources placed, positioned, or attached between the segment cathode electrodes $432_1$ to $432_N$ and the first membrane segments $412_1$ to $412_N$. The N voltage sources $444_1$ to $444_N$ are second voltage sources placed, positioned, or attached between the first membrane segments $412_1$ to $412_N$ and the second membrane segments $414_1$ to $414_N$. The N voltage sources $446_1$ to $446_N$ are third voltage sources placed, positioned, or attached between the second membrane segments $414_1$ to $414_N$ and the segment anode electrodes $434_1$ to $434_N$.

The N voltage sources $442_1$ to $442_N$, N voltage sources $444_1$ to $444_N$, and N voltage sources $446_1$ to $446_N$ may be any suitable fixed or variable voltage sources. They may be controlled by the controller 160 (FIG. 1). By providing different voltages along the flows of the concentration channels 222 and 224, different ion movements may be obtained, resulting in a flexible and efficient ion removal.

Figure 5:
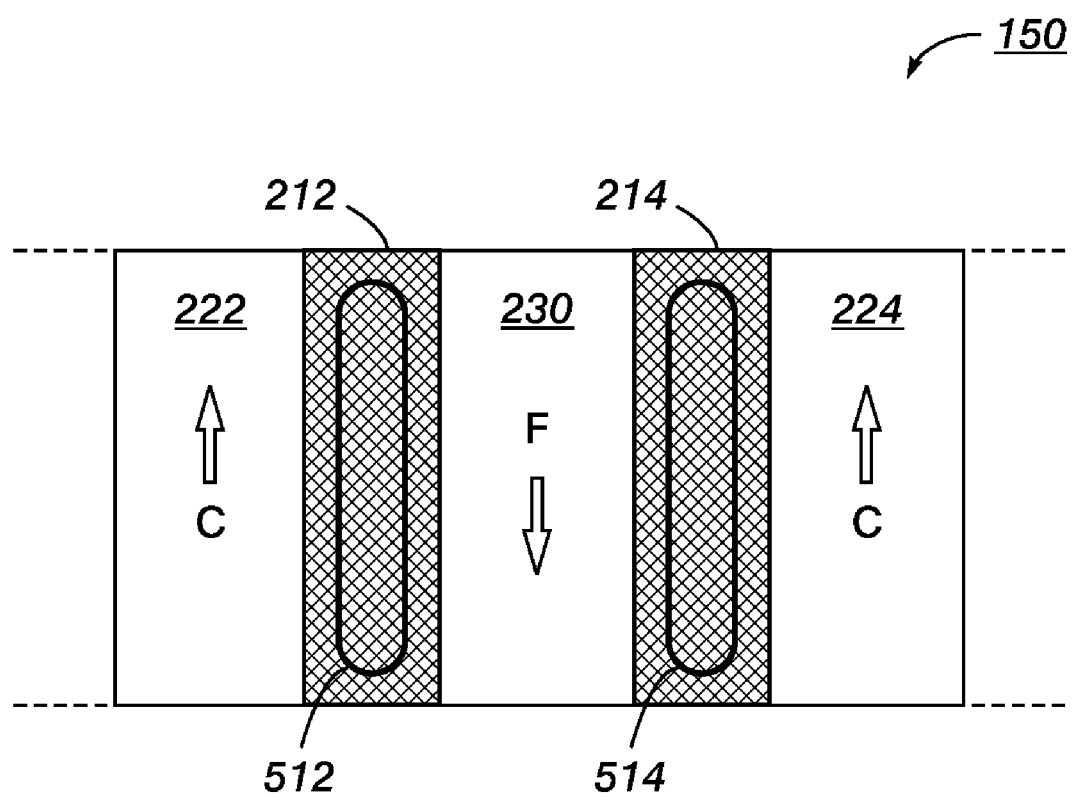
FIG. 5 is a diagram illustrating a de-ionization unit with metal meshes in the conductive membranes according to one embodiment.

FIG. 5 is a diagram illustrating the de-ionization unit 150 shown in FIG. 1 with metal meshes in the conductive membranes according to one embodiment. In this embodiment, the conductive porous membranes 212 and 214 may contain metal meshes 512 and 514, respectively. The use of the metal meshes is to prevent any significant voltage drop inside of low-conductivity porous membranes. This tendency may also be counteracted by using membranes 212 and 214 that have high conductivity (e.g., in the $10^6$ to $10^8$ S-m$^{-1}$, or Siemens per meter, range). The metal meshes 512 and 514 may be made of any suitable metal such as copper, silver, gold, aluminum, etc. The metal mesh may also provide additional structural support for the porous conductive membranes.

Figure 6:
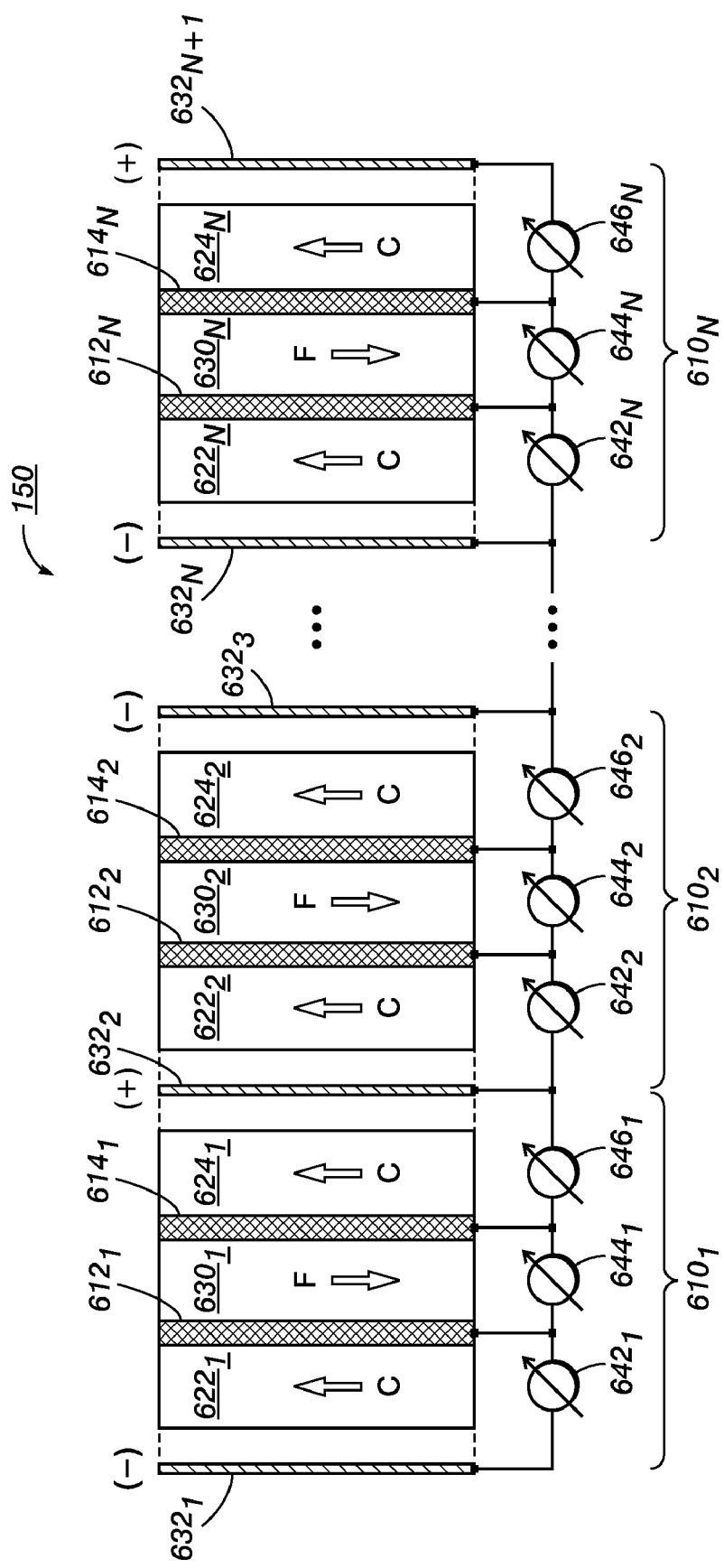
FIG. 6 is a diagram illustrating a de-ionization unit using stacked de-ionization cells with conductive membranes according to one embodiment.

FIG. 6 is a diagram illustrating the de-ionization unit 150 shown in FIG. 1 using stacked de-ionization cells with conductive membranes according to one embodiment. The de-ionization unit 150 includes N de-ionization cells $610_1$ to $610_N$ stacked together in parallel. Each of the N de-ionization cells $610_1$ to $610_N$ is similar to any one of the de-ionization units shown in FIGS. 2, 3, and 4. For simplicity, FIG. 6 shows the stacked de-ionization cells of the embodiment shown in FIG. 2. For example, cell $610_1$ includes conductive membranes $612_1$ and $614_1$, feed channel $630_1$, concentration channels $622_1$ and $624_1$, and electrodes $632_1$ and $632_2$, and voltage sources $642_1$, $644_1$, and $646_1$. Similarly, cell $610_N$ includes conductive membranes $612_N$ and $614_N$, feed channel $630_N$, concentration channels $622_N$ and $624_N$, and electrodes $632_N$ and $632_{N+1}$, and voltage sources $642_N$, $644_N$, and $646_N$.

The N de-ionization cells $610_1$ to $610_N$ may share electrodes for adjacent cells. For example, cell $610_1$ and cell $610_2$ share the same electrode $632_2$. Since the electrode $632_2$ is an anode electrode, the other electrode on the other side of the cell $610_2$ is a cathode electrode $632_3$.

Stacking the de-ionization cells $610_1$ to $610_N$ provides high throughput with space efficiency. For N cells, there are N+1 electrodes.

Figure 7:
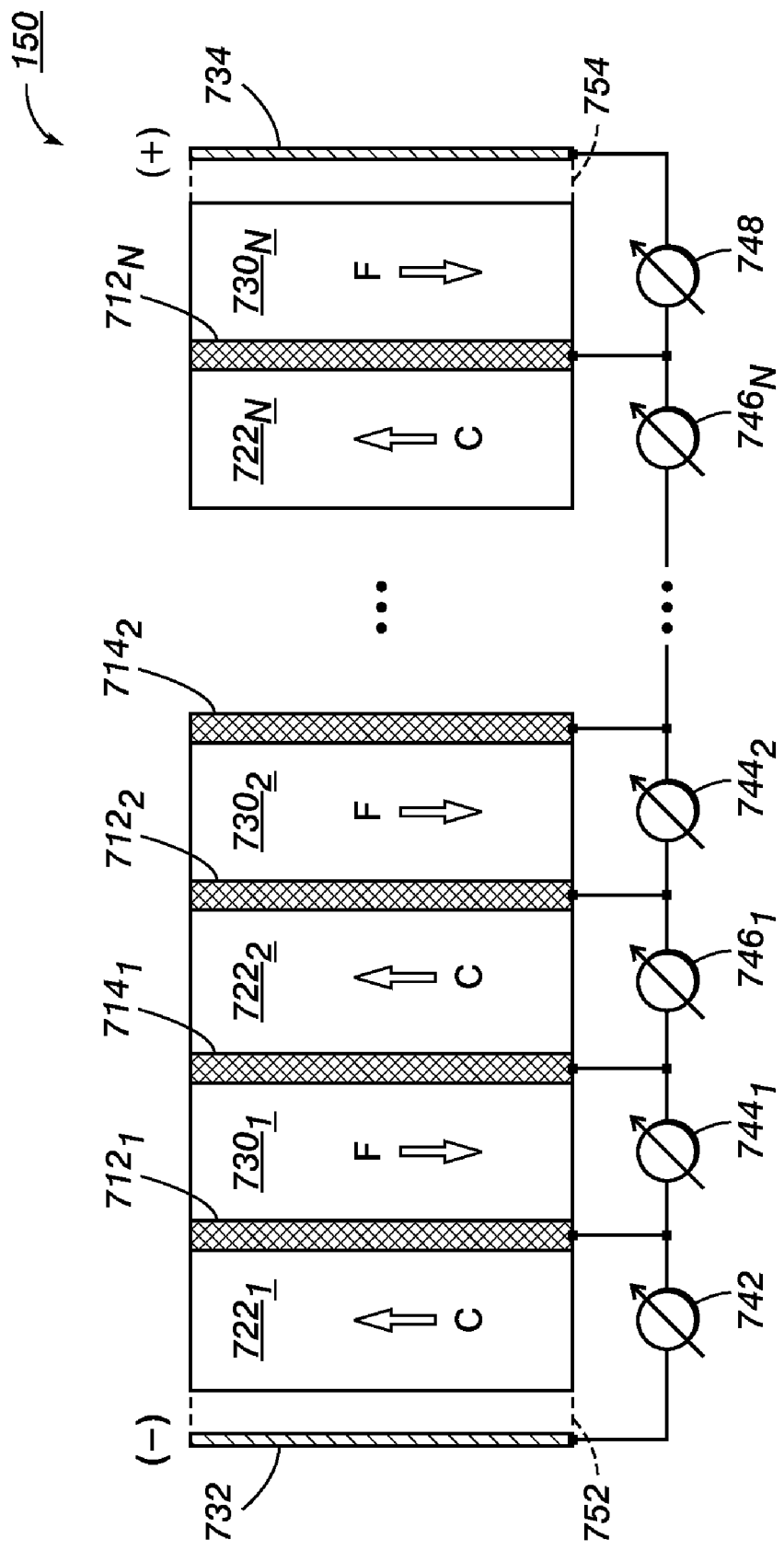
FIG. 7 is a diagram illustrating a de-ionization unit using stacked de-ionization cells with conductive and ion exchange membranes according to one embodiment.

FIG. 7 is a diagram illustrating the de-ionization unit 150 shown in FIG. 1 using stacked de-ionization cells with conductive and ion exchange membranes according to one embodiment. The de-ionization unit 150 shown in FIG. 7 is similar to the de-ionization unit shown in FIG. 6 except that there are only two electrodes on two sides of the entire unit and the channels are alternately feed channels and concentration channels. In addition, the membranes are both conductive membranes and ion exchange membranes.

The de-ionization unit 150 includes N concentration channels $722_1, 722_2, \ldots, 722_N$, feed channels $730_1, 730_2, 730_N$, N first membranes $712_1, 712_2, \ldots, 712_N$, and N−1 second membranes $714_1, 714_2, \ldots, 714_{N-1}$. There are two electrodes 732 and 734 and two optional buffer chambers 752 and 754. Each of the N first membranes $712_1, 712_2, \ldots, 712_N$, and N−1 second membranes $714_1, 714_2, \ldots, 714_{N-1}$ are both conductive and ion-exchanging. They may be formed by laminating an anion exchange membrane (AEM) or cation exchange membrane (CEM) to an aerogel membrane or by incorporating conductive media into the ion exchange membranes (AEM or CEM) directly. There are a voltage source 742 connected between the cathode electrode 732 and the first membrane $712_1$, N voltage sources $744_1$ to $744_N$ between the two consecutive membranes $712_k$ and $714_k$ (k=1, ..., N), N voltage sources $746_1$ to $746_N$ (k=1, ..., N) between two consecutive membranes $714_k$ and $712_k$, and a voltage source 748 between the last membrane $712_N$ and the anode electrode 734.

Figure 8:
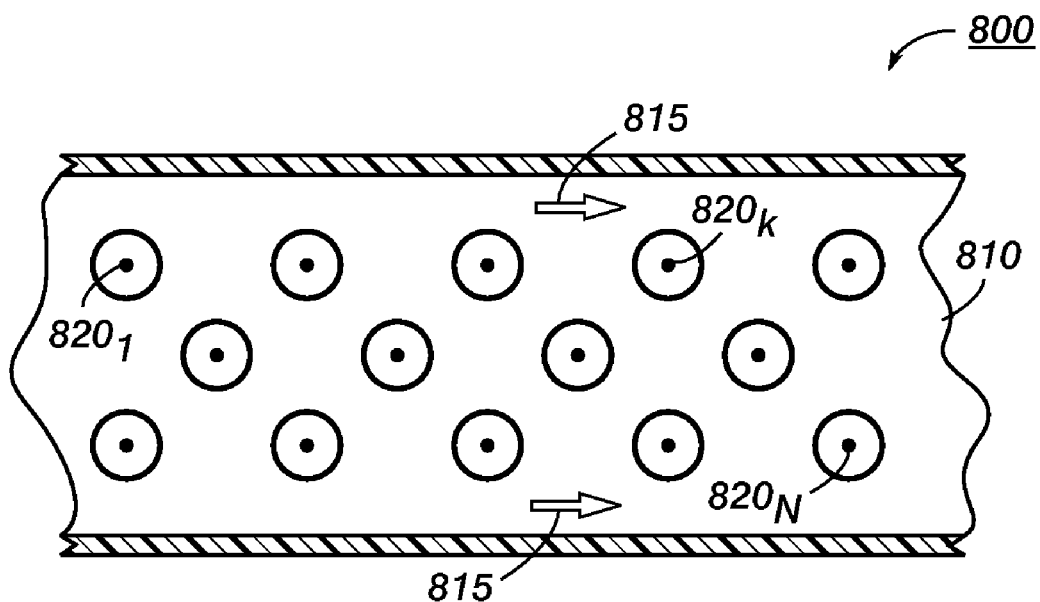
FIG. 8 is a diagram illustrating a de-ionization unit using multiple cylindrical-shaped membranes according to one embodiment.

FIG. 8 is a diagram illustrating a de-ionization unit 800 using multiple cylindrical-shaped membranes according to one embodiment. The de-ionization unit 800 includes a feed channel 810 and N cylindrical-shaped membrane and concentration channel assembly $820_1$ to $820_N$.

The feed channel 810 is similar to the feed channel 230 in FIG. 2. It carries a feed flow with a flow direction 815. The N cylindrical-shaped membrane and concentration channel assembly $820_1$ to $820_N$ may be positioned in parallel with or perpendicular to the feed flow 815 of the feed channel 810. This configuration of the feed channel 810 and the membrane and channel assembly $820_1$ to $820_N$ may enhance the volume to surface ratio for ion removal while increasing the total flow rate through the feed channel 810.

Figure 9:
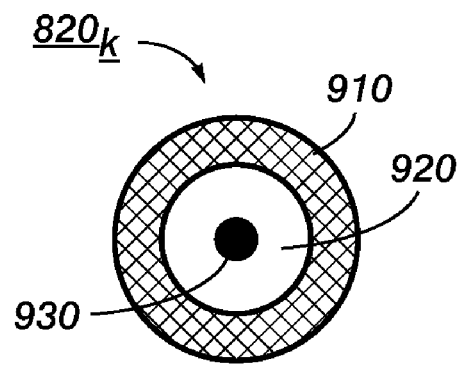
FIG. 9 is a diagram illustrating a cylindrical-shaped membrane according to one embodiment.

FIG. 9 is a diagram illustrating the cylindrical-shaped membrane and channel assembly $820_k$ (k=1, ..., N) according to one embodiment. The assembly $820_k$ includes a membrane 910, a concentration channel 920, and an electrode 930.

The membrane 910 has a cylindrical or tubular shape. It may be made of electrically conductive porous materials such as carbon aerogels or porous aluminum foams or any suitable conductive porous materials similar to the material of the membranes 212 and 214 shown in FIG. 2. It may also have high conductivity and/or contain an embedded metal mesh as shown in FIG. 5. It encloses the concentration channel 920. The concentration channel 920 carries concentration flow as the channel 222 or 224 described in FIG. 2. The electrode 930 may be positioned in the center of the cylinder or tube of the membrane 910. It may be designed to accommodate alternating current.

Figure 10:
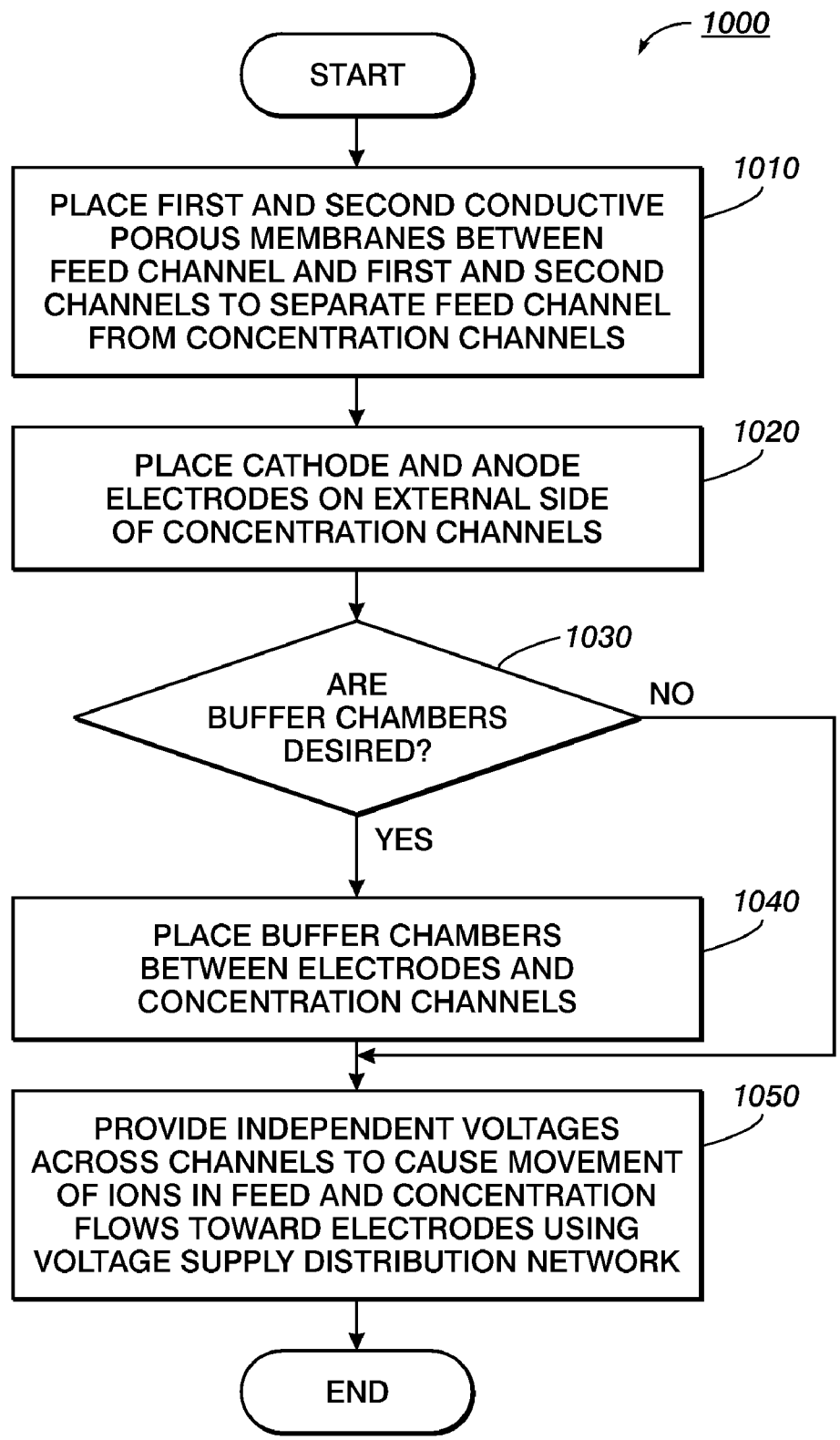
FIG. 10 is a flowchart illustrating a process to de-ionize flows according to one embodiment.

FIG. 10 is a flowchart illustrating a process 1000 to de-ionize flows according to one embodiment.

Upon START, the process 1000 places first and second conductive porous membranes between a feed channel having feed flow and first and second concentration channels having first and second concentration flows to separate the feed channel from the concentration channels (Block 1010). Next, the process 1000 places cathode and anode electrodes on external sides of the concentration channels (Block 1020).

Then, the process 1000 determines if the buffer chambers are desired (Block 1030). If not, the process 1000 goes to block 1050. Otherwise, the process 1000 places buffer chambers between the electrodes and the concentration channels (Block 1040).

Next, the process 1000 provides independent voltages across the channels to cause movement of ions in the feed and concentration flows toward the electrodes using a voltage supply distribution network (Block 1050) and is then terminated. In Block 1050, the process may provide the independent voltages according to the embodiments shown in FIGS. 2, 3, and 4. For example, according to the embodiment in FIG. 2, the process 1050 provides a first voltage source between the cathode electrode and the first conductive porous membrane, provides a second voltage source between the first conductive porous membrane and the second conductive porous membrane, and provides a third voltage source between the second conductive porous membrane and the anode electrode.

Figure 11:
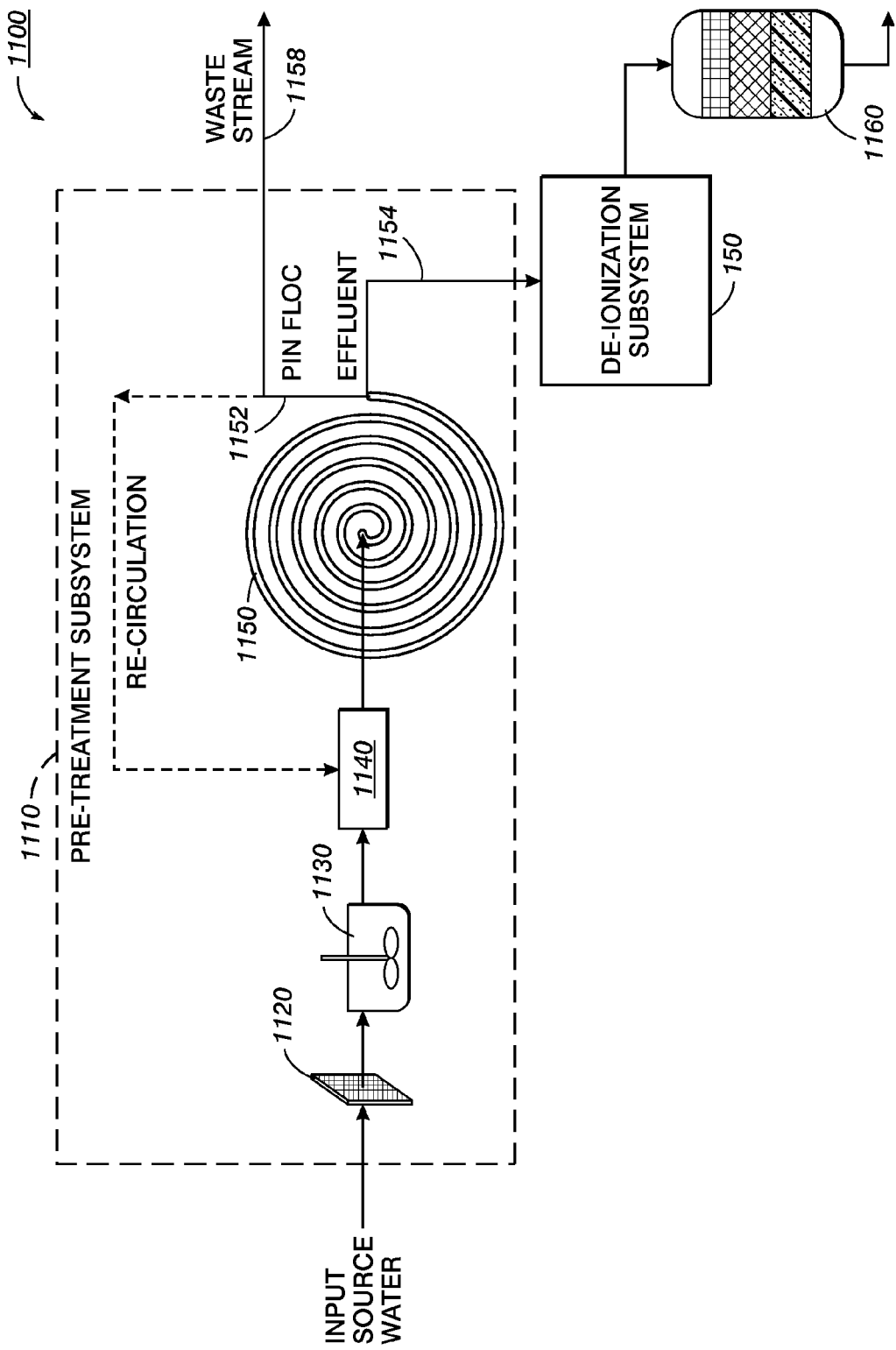
FIG. 11 is a diagram illustrating a two-stage system for particle extraction and de-ionization according to one embodiment.

FIG. 11 is a diagram illustrating a two-stage system 1100 for particle extraction and de-ionization according to one embodiment. The system 1100 includes a pre-treatment subsystem 1110 and a de-ionization subsystem 150 and a filtration barrier 1160. The system 1100 may include more or less than the above components. The advantages of the system 1100 include the construction of compact integrated systems where all or most components may be scaled together to meet any required throughput. The de-ionization unit 150 used in the system 1100 may be used as a desalination unit.

The pre-treatment subsystem 1110 may reduce clogging due to colloidal and/or biological contamination of the source water. Typically, any pre-treatment subsystem may be used. The pre-treatment subsystem 1110 shown in FIG. 11 illustrates a particle extraction subsystem. It may include a mesh screen 1120, a coagulant mixer 1130, a reduced coagulation tank 1140, and a particle extractor 1150. The particle extractor 1150 provides pin floc with particles of large sizes (e.g., greater than 1-5 μm) which become a waste stream 1158. The waste stream 1158 may be re-circulated to go to the reduced coagulation to increase water recovery. The particle extractor 1150 also provides an effluent 1154 which provides the feed channel for the de-ionization subsystem 150. The filtration barrier 1160 provides various layers of filtration to filter the de-ionized flows from the de-ionization unit 150.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
   first and second conductive porous membranes placed between a feed channel having a feed flow and first and second concentration channels having first and second concentration flows, respectively, to separate the feed channel from the concentration channels, wherein the feed flow and the first and second concentration flows are continuous flows to provide continuous de-ionization and wherein the feed flow and first and second concentration flows are parallel;
   cathode and anode electrodes placed on external sides of the concentration channels; and
   a voltage supply distribution network coupled to the electrodes to provide independent voltages across the channels to cause movement of ions in the feed and concentration flows toward the electrodes.

2. The apparatus of claim 1 further comprising:
   buffer chambers between the electrodes and the concentration channels.

3. The apparatus of claim 1 wherein the voltage supply distribution network comprises:
   a first voltage source electrically positioned between the cathode electrode and the first conductive porous membrane;
   a second voltage source electrically positioned between the first conductive porous membrane and the second conductive porous membrane; and
   a third voltage source electrically positioned between the second conductive porous membrane and the anode electrode.

4. The apparatus of claim 1 wherein the cathode and anode electrodes comprises:
   a plurality of segment cathode electrodes placed along flow direction of the first concentration channel; and
   a plurality of segment anode electrodes placed along flow direction of the second concentration channel.

5. The apparatus of claim 4 wherein the voltage supply distribution network comprises:
   a plurality of first electrical elements coupled to the segment cathode electrodes to provide potential differences between the segment cathode electrodes;
   a plurality of second electrical elements coupled to the segment anode electrodes to provide potential differences between the segment anode electrodes; and
   a supply voltage source connected to the segment cathode and anode electrodes via the first and second electrical elements to provide incremental voltage differences across the channels along the flow directions of the first and second concentration channels.

6. The apparatus of claim 1 wherein the first and second conductive porous membranes comprises:
   a plurality of first membrane segments of the first conductive porous membrane; and
   a plurality of second membrane segments of the second conductive porous membrane.

7. The apparatus of claim 6 wherein the cathode and anode electrodes comprise:
   a plurality of segment cathode electrodes placed along flow direction of the first concentration channel; and
   a plurality of segment anode electrodes placed along flow direction of the second concentration channel.

8. The apparatus of claim 7 wherein the voltage supply distribution network comprises:
   a plurality of first voltage sources electrically positioned between the segment cathode electrodes and the first membrane segments;
   a plurality of second voltage sources electrically positioned between the first membrane segments and the second membrane segments; and
   a plurality of third voltage sources electrically positioned between the second membrane segments and the segment anode electrodes.

9. The apparatus of claim 1 wherein the first and second conductive porous membranes comprise first and second embedded metal meshes, respectively.

10. The apparatus of claim 1 wherein the membranes are stacked on parallel channels or spirally wound.

11. A method comprising:
    placing first and second conductive porous membranes between a feed channel having feed flow and first and second concentration channels having first and second concentration flows, respectively, to separate the feed channel from the concentration channels, wherein the feed flow and the first and second concentration flows are continuous flows to provide continuous de-ionization and wherein the feed flow and first and second concentration flows are parallel;
    placing cathode and anode electrodes on external sides of the concentration channels; and
    providing independent voltages across the channels to cause movement of ions in the feed and concentration flows toward the electrodes using a voltage supply distribution network.

12. The method of claim 11 further comprising:
    placing buffer chambers between the electrodes and the concentration channels.

13. The method of claim 11 wherein providing independent voltages comprises:
    providing a first voltage source electrically positioned between the cathode electrode and the first conductive porous membrane;
    providing a second voltage source electrically positioned between the first conductive porous membrane and the second conductive porous membrane; and
    providing a third voltage source electrically positioned between the second conductive porous membrane and the anode electrode.

14. The method of claim 11 wherein placing cathode and anode electrodes comprises:
    placing a plurality of segment cathode electrodes along flow direction of the first concentration channel; and
    placing a plurality of segment anode electrodes along flow direction of the second concentration channel.

15. The method of claim 14 wherein providing independent voltages comprises:
    separating the segment cathode electrodes by first electrical elements to provide potential differences between the segment cathode electrodes;
    separating the segment anode electrodes by second electrical elements to provide potential differences between the segment anode electrodes; and
    providing incremental voltage differences across the channels along the flow directions of the first and second concentration channels using a supply voltage source connected to the segment cathode and anode electrodes via the first and second electrical elements.

16. The method of claim 11 wherein placing first and second conductive porous membranes comprises:

placing a plurality of first membrane segments of the first conductive porous membrane; and placing a plurality of second membrane segments of the second conductive porous membrane.

17. The method of claim 16 wherein placing cathode and anode electrodes comprises:

placing a plurality of segment cathode electrodes placed along flow direction of the first concentration channel; and placing a plurality of segment anode electrodes placed along flow direction of the second concentration channel.

18. The method of claim 17 wherein providing independent voltages comprises:

providing a plurality of first voltage sources electrically positioned between the segment cathode electrodes and the first membrane segments;

providing a plurality of second voltage sources electrically positioned between the first membrane segments and the second membrane segments; and providing a plurality of third voltage sources electrically positioned between the second membrane segments and the segment anode electrodes.

19. The method of claim 11 wherein placing first and second conductive porous membranes comprises embedding first and second metal meshes in the first and second conductive porous membranes, respectively.

20. The method of claim 11 wherein the membranes are stacked on parallel channels or spirally wound.

21. A system comprising:

a pre-treatment subsystem to extract particles from an input water source; and a de-ionization subsystem coupled to the pre-treatment subsystem to de-ionize fluid from the pre-treatment subsystem, the de-ionization subsystem comprising a first de-ionization unit comprising:

first and second conductive porous membranes placed between a feed channel having a feed flow and first and second concentration channels having first and second concentration flows, respectively, to separate the feed channel from the concentration channels, wherein the feed flow and the first and second concentration flows are continuous flows to provide continuous de-ionization and wherein the feed flow and first and second concentration flows are parallel, cathode and anode electrodes placed on external sides of the concentration channels, and a voltage supply distribution network coupled to the electrodes to provide independent voltages across the channels to cause movement of ions in the feed and concentration flows toward the electrodes.

22. The system of claim 21 wherein the first de-ionization unit comprises:

buffer chambers between the electrodes and the concentration channels.

23. The system of claim 21 wherein the voltage supply distribution network comprises:

a first voltage source electrically positioned between the cathode electrode and the first conductive porous membrane;

a second voltage source electrically positioned between the first conductive porous membrane and the second conductive porous membrane; and a third voltage source electrically positioned between the second conductive porous membrane and the anode electrode.

* * * * *